(12) United States Patent
Cash

(10) Patent No.: US 6,881,010 B2
(45) Date of Patent: Apr. 19, 2005

(54) SYSTEMS FOR ON SITE TREATMENT AND DISPOSAL OF CONTAMINATED SOILS AND SEDIMENTS

(76) Inventor: Alan Brian Cash, 5033 Seachase St., San Diego, CA (US) 92130

( * ) Notice: Subject to any disclaimer, the term of this patent is extended or adjusted under 35 U.S.C. 154(b) by 0 days.

(21) Appl. No.: 10/391,468

(22) Filed: Mar. 17, 2003

(65) Prior Publication Data

US 2003/0215290 A1 Nov. 20, 2003

Related U.S. Application Data

(60) Provisional application No. 60/365,570, filed on Mar. 18, 2002.

(51) Int. Cl.[7] ................................................ B09B 1/00
(52) U.S. Cl. ............................ 405/129.57; 405/129.65; 405/129.7; 210/747
(58) Field of Search .......................... 405/128.1, 128.5, 405/128.7, 128.75, 129.1–129.95; 210/747

(56) References Cited

U.S. PATENT DOCUMENTS

| | | | | |
|---|---|---|---|---|
| 4,292,953 A | | 10/1981 | Dickinson | |
| 4,327,027 A | | 4/1982 | Howard et al. | |
| 4,351,978 A | | 9/1982 | Hatano et al. | |
| 4,353,793 A | | 10/1982 | Brunelle | |
| 4,366,846 A | * | 1/1983 | Curati, Jr. ................. | 210/747 |
| 4,430,208 A | | 2/1984 | Pytlewski et al. | |
| 4,447,541 A | | 5/1984 | Peterson | |
| 4,471,143 A | | 9/1984 | Pytlewski et al. | |
| 4,483,716 A | | 11/1984 | Heller | |
| 4,523,043 A | | 6/1985 | Pytlewski et al. | |
| 4,624,604 A | * | 11/1986 | Wagner et al. ............ | 405/129.7 |
| 4,752,402 A | * | 6/1988 | Gray .......................... | 210/747 |
| 4,947,470 A | * | 8/1990 | Darilek ..................... | 405/129.5 |
| 5,056,960 A | * | 10/1991 | Marienfeld ................ | 405/270 |
| 5,096,600 A | | 3/1992 | Hoch | |
| 5,096,678 A | * | 3/1992 | Mackie ....................... | 423/27 |
| 5,258,303 A | * | 11/1993 | Stenger ..................... | 435/262 |
| 5,384,048 A | | 1/1995 | Hazen et al. | |
| 5,398,757 A | | 3/1995 | Corte et al. | |
| 5,622,864 A | * | 4/1997 | Buchanan ................ | 435/290.1 |
| 5,804,434 A | | 9/1998 | Cash | |
| 6,102,617 A | * | 8/2000 | Hampton .................... | 405/52 |

* cited by examiner

Primary Examiner—John Kreck
(74) Attorney, Agent, or Firm—Nydegger & Associates

(57) ABSTRACT

A system for the onsite storage, treatment and disposal of contaminated soils and sediments includes a trench that is excavated at the site. The trench is formed with a bottom surface that includes a sump reservoir and a sloped portion oriented to feed liquids into the sump reservoir. An impervious liner is positioned in the trench to prevent leakage into the surroundings. A sump system that includes the sump reservoir, drain tubes and geotextile netting is disposed in the trench to transfer fluids between the sump reservoir and the contaminated material. A geotextile filter sheet is positioned over the sump system allowing fluid transfer between the sump system and the contaminated material while preventing solids from entering the sump system. An access pipe allows fluids to be introduced into and withdrawn from the sump reservoir to accomplish various treatment methods including de-watering, vapor extraction, bioremediation, surfactant washing and solvent extraction.

13 Claims, 2 Drawing Sheets

SYSTEMS FOR ON SITE TREATMENT AND DISPOSAL OF CONTAMINATED SOILS AND SEDIMENTS

This application claims the benefit of U.S. Provisional Application Ser. No. 60/365,570 filed Mar. 18, 2002.

FIELD OF THE INVENTION

The present invention pertains generally to on-site systems for treating contaminated soils and sediments. More particularly, the present invention pertains to methods for constructing and using an on-site treatment and disposal system suitable for the treatment of contaminated soils and sediments. The present invention is particularly, but not exclusively, useful for the treatment and on-site disposal of contaminated soils and sediments requiring de-watering, bioremediation, vapor extraction, solvent extraction and/or surfactant washing treatments.

BACKGROUND OF THE INVENTION

A recent survey by the Environmental Protection Agency (EPA) has concluded that there is over 1.2 billion cubic yards of contaminated sediment in the United States requiring treatment. In addition to this large volume of contaminated sediment, a large volume of contaminated soil that requires treatment is present at numerous Brownfield sites, Superfund sites and other industrial sites. Typically, these soils and sediments are contaminated with one or more hazardous materials such as Polychlorinated Biphenyls (PCBs), Dioxins, Chlorinated Pesticides, Semi-Volatile Organic contaminants (SVOCs) and Volatile Organic Contaminants (VOCs).

Typical treatment technologies for decontaminating soils and sediments include incineration, vapor extraction, biological remediation, solvent extraction and surfactant washing. Once treated, the soils/sediments are typically sent to a landfill for disposal. Heretofore, the above-described treatments have typically been accomplished by first transporting the contaminated soil/sediment to an offsite, permitted treatment facility. More specifically, a transport container such as a roll-off bin must first be trucked out to the contaminated site together with transfer equipment such as a backhoe. After transport of the contaminated material to the treatment facility, the contaminated soil/sediments are typically transferred from the roll-off bin to a larger treatment container. Depending on the type and number of treatments that are required, the material may thereafter be transferred several times to several different treatment containers. After offsite treatment, the treated material is often transferred back into a roll-off bin for transport to a landfill whereupon the material is once again transferred, this time from the roll-off bin and into the landfill.

In nearly all cases, the above-described transfers and the transportation of the soil/sediments are time consuming and extremely expensive. In addition to the financial costs, each transfer can potentially release contaminants to the environment, for example, by the generation of dust or the release of volatiles. Also, contaminants may be released during transport, for example, if the transport vehicle is involved in an accident. Accordingly, transportation of contaminated material poses a risk to the residents and the environment along the transportation route. Because of these risks, transport and transfer operations are typically regulated by local, state and/or the federal government and this regulation can significantly increase the costs of these operations.

Another factor that affects the cost of transferring and transporting soils and sediments is the fact that soils and sediments are typically very heavy. In particular, sediments obtained using dredging processes can be extremely heavy due to their high water content that typically constitutes about 30% to 95% of the dredged material. The heavy nature of soil/sediments dictates that storage, shipping and treatment containers have significant structural strength. Typically, these containers are made of steel, causing the containers to be heavy and expensive.

Although there are certain advantages to processing soil/sediments at the contaminated site, in the past these efforts have typically involved transporting the various treatment containers, storage containers and processing equipment (similar to those that are used at an offsite treatment facility) to the contaminated site. Unfortunately, the transportation and post-treatment decontamination of this equipment typically constitutes a major portion of the total cleanup cost.

In light of the above, it is an object of the present invention to provide systems and methods for the storage, treatment (including de-watering), and disposal of contaminated soil/sediments in a single container that can be efficiently constructed(at a contamination site. It is another object of the present invention to provide systems and methods for constructing a container at a contamination site for use in the storage, treatment and disposal of contaminated soil/sediments that can be fabricated without heavy structural elements that must be shipped to the contaminated site. It is yet another object of the present invention to provide systems and methods for the creation of an onsite soil/sediment treatment container that can be easily sized for the volume of soil and sediment that requires treatment at the site. Yet another object of the present invention is to provide methods and systems for the onsite storage, treatment, and disposal of contaminated soil/sediments which are easy to use, relatively simple to implement, and comparatively cost effective.

SUMMARY OF THE INVENTION

The present invention is directed to systems and methods for the onsite storage, treatment and disposal of a contaminated material which typically includes, but is not limited to contaminated soils and sediments. The system includes a trench that is excavated at (or proximate to) the site where the contaminated material was generated. The trench can be excavated using a standard construction implement such as a backhoe. Once excavated, the trench is formed with a bottom surface and a sidewall. For the present invention, the bottom surface includes a sloped portion and a sump reservoir with the sloped portion oriented to cause liquid to run along the sloped portion and into the sump reservoir.

To prevent fluids (e.g. liquids and/or gases) that are either present in the contaminated material or generated during the treatment process(es) from leaking into the surroundings, a liner is positioned in the trench to cover the bottom surface and the sidewall. In greater detail, the liner typically includes a layer of geotextile material that overlays and covers the surfaces of the trench. Additionally, one or more impervious layers that typically include a primary and secondary layer are placed over the geotextile layer to prevent fluid leakage. Functionally, the geotextile layer protects the impervious layers from perforation by rocks or other sharp objects that may be present in the natural material surrounding the trench.

To ensure that potentially hazardous fluids are not leaking from the trench and into the environment, a leak detection system is provided. In greater structural detail, one or more slotted pipes are disposed between the secondary layer and the layer of geotextile material to capture and accumulate any fluids that manage to leak through the primary and secondary liner layers. The slotted pumps are plumbed to grade to allow any fluids in the slotted pipes to be collected and analyzed.

For the present invention, the treatment system includes a sump system that is disposed in the trench. The sump system includes, in combination, the sump reservoir described above, a layer of geotextile netting and one or more drain tubes. Each drain tube is formed with a plurality of perforations to establish fluid transfer between the sump reservoir and the contaminated material. More specifically, the drain tubes and netting function to accumulate and deliver fluids to the sump reservoir from the contaminated material. Alternatively, in some treatment applications, the drain tubes and netting function to distribute and deliver fluids to the contaminated material that are pumped into the sump reservoir.

Structurally, each drain tube is positioned on the primary liner and over the sloped portion of the trench. Further, each tube is aligned with the slope to allow liquids that accumulate in each tube to gravity feed into the sump reservoir. The geotextile netting is positioned over the drain tubes to thereby cover the bottom of the trench and extend approximately half way up the sidewall of the trench.

The treatment system further includes a geotextile filter sheet that is positioned over the sump system and extends up the sidewall of the trench. With this cooperation of structure, the filter sheet partitions the trench into a sump volume (below the filter sheet) and a holding volume (above the filter sheet) for containing the contaminated material. Functionally, the filter sheet allows fluid transfer between the sump system and the contaminated material while preventing solids from passing from the contaminated material and into the sump system. As implied above, this fluid transfer includes the ability to pass fluids into the contaminated material from the sump system as well as the ability to pass fluids into the sump system from the contaminated material.

Also for the present invention, an access pipe is provided to transfer fluids between the sump system and an access location that is typically positioned outside (e.g. above) the trench. More specifically, the access pipe extends from a first end which is positioned in the sump reservoir to a second end that is located above the trench.

With the access pipe in place, the contaminated material can be introduced into the trench and on top of the filter sheet. Next, a cover is typically placed over the contaminated material to prevent any volatiles in the contaminated material from being released into the air. The cover can also function to prevent surface waters and rain from entering the trench. Once the contaminated material has been placed in the trench, the contaminated material can be safely stored for an indefinite period of time prior to treatment. During storage, the leak detection system can be used to monitor the condition of the liners and prevent environmental contamination due to leakage.

Typical treatment methods that can be performed using the treatment system described above include, but are not necessarily limited to, de-watering, vapor extraction, bioremediation, surfactant washing and solvent extraction. For example, water in the contaminated material, under the influence of gravity will flow from the contaminated material, through the filter sheet and into the sump system. Once in the sump system, the water can be pumped from the sump reservoir using the access pipe.

A vapor extraction method can be performed using the treatment system by removing vapors from the sump system to thereby extract volatile organic components (VOC) from the contaminated material. More specifically, these vapors can be removed from the sump system by applying a vacuum on the access pipe. Also, the treatment system can be used to accomplish a bioremediation method on the contaminated material. Specifically, microbes, nutrients and water can be selectively added to the contaminated material and air can be pumped into the sump system for contact with the contaminated material to provide oxygen to the microbes to enhance the bioremediation process.

In another treatment method, the treatment system can be used to surfactant wash the contaminated material by adding a surfactant solution to the contaminated material, and then removing the resultant leachate from the sump system. In a somewhat similar process, a solvent extraction can be performed using the treatment system by pumping a solvent into the contaminated material and thereafter removing the resultant leachate from the sump system using the access pipe. After the contaminated material has been effectively treated, a spike can be driven through the liner to allow the material to be disposed of in-place.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
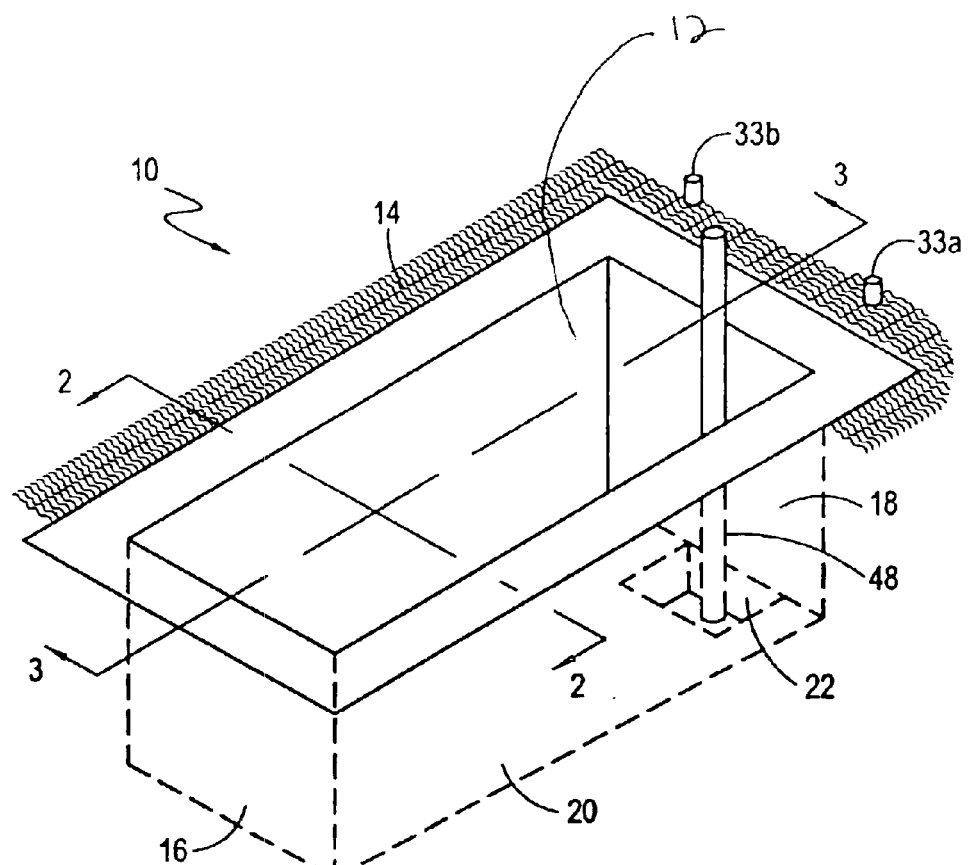
FIG. 1 is a simplified, not necessarily to scale, perspective illustration of an onsite system for the storage, treatment and disposal of contaminated soil/sediments.

Referring to FIG. 1, an onsite system for the storage, treatment and disposal of a contaminated material such as contaminated soil or contaminated sediments is shown and generally designated 10. As shown in FIG. 1, the system 10 includes a trench 12 that is excavated at (or proximate to) the site where the contaminated material was generated. For the system 10, the trench 12 is typically excavated (i.e. dug) from grade 14 using a standard construction implement such as a backhoe (not shown). As further shown in FIG. 1, the trench 12 is formed with a bottom surface 16 and a sidewall 18 that extends from the bottom surface 16 to grade 14. As detailed further below, the bottom surface 16 is shaped to create a sloped portion 20 and a sump reservoir 22 with the sloped portion 20 oriented to cause liquid to run along the sloped portion 20 and into the sump reservoir 22 (see also FIG. 3).

Figure 2:
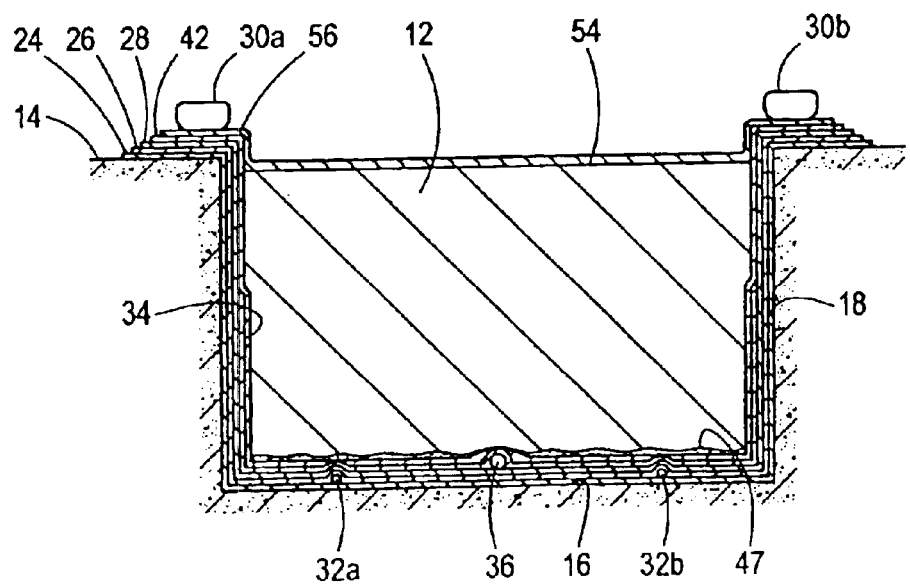
FIG. 2 is a cross-sectional view of the system shown in FIG. 1 as seen along line 2—2 in FIG. 1.

Referring now to FIG. 2, it can be seen that the system 10 includes a liner having a layer of geotextile material 24, a secondary layer 26 and a primary layer 28. As shown, the liner is positioned in the trench 12 to overlay and cover both the bottom surface 16 and the sidewall 18. As further shown, the liner extends out of the trench 12 and along the grade 14 where it is held in place using sandbags 30a,b. The primary layer 28 and secondary layer 26 are made of an impervious material to prevent fluids that are either present in the contaminated material or generated during the treatment process(es) from leaking into the surroundings.

For the system 10, the layer of geotextile material 24 is provided to protect the primary layer 28 and secondary layer 26 from perforation by rocks or other sharp objects that may be present in the natural material surrounding the trench 12. For this purpose, any commercially available geotextile material is suitable for the system 10.

Continuing now with reference to FIG. 2, it can be seen that the system 10 can include a leak detection system having one or more slotted pipes 32a,b that are disposed between the secondary layer 26 and the layer of geotextile material 24. For the system 10, each slotted pipe 32a,b extends along the length of the trench 12 and is plumbed to a respective riser 33a,b. Each riser 33a,b, in turn, extends upwardly from a respective slotted pipe 32a,b to a position above the grade 14, as shown in FIG. 1. For the embodiment shown, the slotted pipes 32a,b are aligned with the sloped portion 20 and the risers 33a,b are connected to the slotted pipes 32a,b at the low point of each slotted pipe 32a,b. With this cooperation of structure, any fluids in the slotted pipes 32a,b can be collected using the risers 33a,b and thereafter analyzed using techniques that are well known in the pertinent art. Functionally, the leak detection system is provided to ensure that potentially hazardous fluids from the trench 12 have not leaked through both the primary layer 28 and secondary layer 26 and into the environment.

Figure 3:
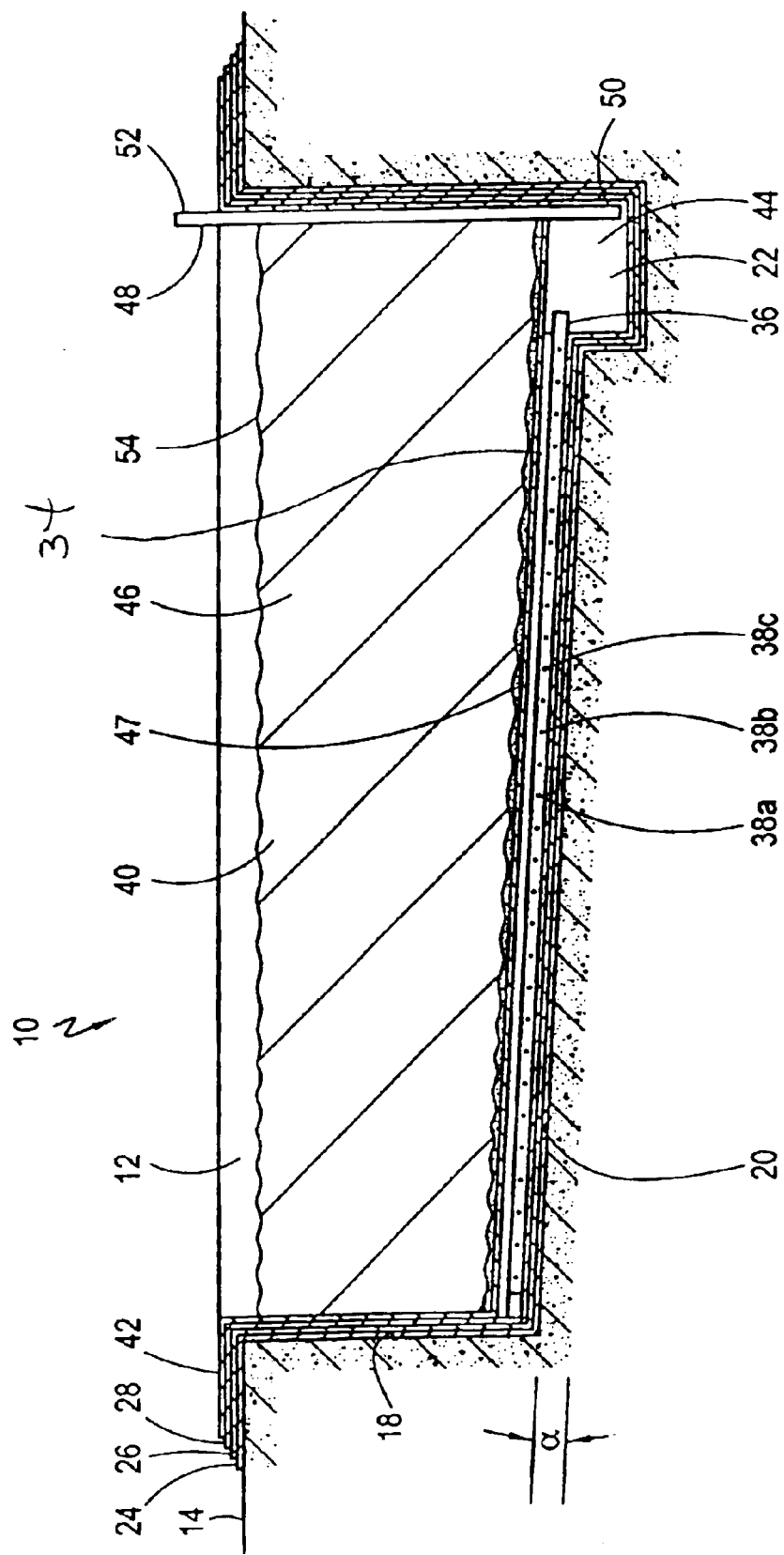
FIG. 3 is a cross-sectional view of the system shown in FIG. 1 as seen along line 3—3 in FIG. 1.

As best seen in FIG. 3, a sump system is provided for the system 10 that includes the sump reservoir 22 (see partial description above), a layer of geotextile netting 34 and one or more drain tubes, in this case drain tube 36. As shown, the drain tube 36 is formed with a plurality of perforations 38, including selected perforations 38a, 38b and 38c which have been labeled in FIG. 3. The perforations 38 are sized to allow fluids to pass through the perforations 38 during treatment procedures. In some treatment methods (see detailed discussion below) the drain tube 36 and geotextile netting 34 function to accumulate and deliver fluids to the sump reservoir 22 from the contaminated material 40. In other treatment methods, the drain tube 36 and geotextile netting 34 function to distribute and deliver fluids that are introduced into the sump reservoir 22 to the contaminated material 40.

As shown in FIG. 3, the drain tube 36 is positioned on the primary liner 28 and over the sloped portion 20 of the trench 12. As best seen in FIG. 3, the sloped portion 20 is sloped at a slope angle, $\alpha$, relative to the grade 14 (which is typically level, as shown). In a typical embodiment of the system 10, a slope angle, $\alpha$, of approximately three degrees (3°) is used. As further shown in FIG. 3, the drain tube 36 is aligned with the slope to allow liquids that accumulate in the drain tube 36 to gravity feed into the sump reservoir 22. The geotextile netting 34 is positioned over the drain tube 36 and primary liner 28 and typically extends approximately half way up the sidewall 18 of the trench 12. The geotextile netting 34 allows fluids to move easily along the plane of the geotextile netting 34. Any commercially available geotextile netting 34 is suitable for use in the system 10.

Continuing with FIG. 3, it can be seen that the system 10 further includes a geotextile filter sheet 42 that is positioned over the sump system and extends up the sidewall 18 and along the grade 14. With this cooperation of structure, the filter sheet 42 partitions the trench 12 into a sump volume 44 (below the filter sheet 42) and a holding volume 46 (above the filter sheet 42) for containing the contaminated material 40. Functionally, the filter sheet 42 allows fluid transfer between the sump system (i.e. the sump reservoir 22, drain tube 36 and geotextile netting 34) and the contaminated material 40 while preventing solids from passing from the contaminated material 40 and into the sump system. As implied above, this fluid transfer includes the ability to pass fluids into the contaminated material 40 from the sump system as well as the ability to pass fluids into the sump system from the contaminated material 40. A suitable geotextile filter sheet 42 for use in the system 10 is a filter sheet of a type well known in the pertinent art. For contaminated materials that are low in clay and silt content, a layer of sand 47 can be placed over the geotextile filter sheet 42 as shown in FIGS. 2 and 3.

With continued reference to FIG. 3, it can be seen that the system 10 includes an access pipe 48 that is provided to allow fluids to be transferred between the sump system and an accessible location that is typically positioned outside (e.g. above) the trench 12. As shown, the access pipe 48 extends from a first end 50 which is positioned in the sump reservoir 22 to a second end 52 that is located above the trench 12. In a typical embodiment of the system 10, the first end 50 is positioned about an inch above the bottom of the sump reservoir 22.

Operation

In use, the contaminated material 40 is introduced into the trench 12 and on top of the filter sheet 42, as shown in FIG. 3. Typically, the contaminated material 40 is placed in the trench 12 such that the top surface 54 of the contaminated material 40 remains about six inches below the grade 14. Although the system 10 is particularly suitable for the treatment of contaminated soils, sediments and mixtures thereof, it is to be appreciated that other contaminated materials having solids to include process sludges and bottoms can be treated using the system 10. Further, the system 10 can be used to treat materials that are contaminated with hazardous materials that include, but are not necessarily limited to one or more of the following; Polychlorinated Biphenyls (PCBs), Dioxins, Chlorinated Pesticides, Semi-Volatile Organic contaminants (SVOCs) and Volatile Organic Contaminants (VOCs).

As shown in FIG. 2, the system 10 can include a cover 56 that can be placed over the contaminated material 40 to prevent any volatiles in the contaminated material 40 from being released into the air. The cover 56 can also function to prevent surface waters and rain from entering the trench 12. Once the contaminated material 40 has been placed in the trench 12, the contaminated material 40 can be safely stored for an indefinite period of time prior to treatment. During storage, the leak detection system can be used to monitor the condition of the primary liner 28 and secondary liner 26 and prevent environmental contamination due to leakage.

Typical treatment methods that can be performed using the system 10 described above include, but are not necessarily limited to, de-watering, vapor extraction, bioremediation, surfactant washing and solvent extraction. A typical de-watering treatment using the system 10 can best be appreciated with reference to FIG. 3. In the de-watering method, water in the contaminated material 40, under the influence of gravity, is allowed to flow from the contaminated material 40, through the filter sheet 42 and into the sump system (i.e. the sump reservoir 22, drain tube 36 and geotextile netting 34). Once in the sump system, the water can be pumped from the sump reservoir 22 using the access pipe 48. Typically, a pump (not shown) is connected to a transfer tube (also not shown) which is then inserted into the access pipe 48 to pump water from the sump reservoir 22.

Continuing with FIG. 3, a vapor extraction method can be performed using the system 10 by removing vapors from the sump system to thereby extract volatile organic components (VOC) from the contaminated material 40. More specifically, these vapors can be removed from the sump system by applying a vacuum to the access pipe 48 using a suction pump (not shown). Also, the system 10 can be used to accomplish a bioremediation method on the contaminated material 40. Specifically, microbes, nutrients and water can be selectively added to the contaminated material 40. Next, air can be pumped into the access pipe 48, for example, using an air compressor (not shown) for travel through the sump system. This air then contacts the contaminated material 40 providing oxygen to the microbes to enhance the bioremediation process.

In another treatment method, the system 10 can be used to surfactant wash the contaminated material 40 by adding a surfactant solution to the top of the contaminated material 40, and then removing the resultant leachate from the sump system. In a somewhat similar process, a solvent extraction can be performed using the system 10 by pumping or pouring a solvent onto the contaminated material 40 and thereafter removing the resultant leachate from the sump system using the access pipe 48.

After the contaminated material 40 has been effectively treated, the treated material can be disposed of in-place. Specifically, to dispose of the treated material in place, the cover 56 is first removed and the liner and filter sheet 42 are cut at the level of the top surface 54 of the treated material. The severed liner and filter sheet 42 are then removed and discarded. Next, a pole with an attached spike (not shown) is driven through the treated material and the liner in several places to allow natural drainage of the treated material in the trench 12. The treated material is then covered with about twelve inches of clean soil and graded to cause drainage to flow away from the trench 12.

While the particular systems and methods for the on-site treatment and disposal of contaminated soils and sediments as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A system for onsite treatment of a contaminated material, said system comprising:
    a trench defining a holding volume for containing the contaminated material;
    a liner positioned in said trench to prevent fluids from leaking from said trench;
    a sump system disposed in said trench;
    a filtering means interposed between said sump system and said volume for allowing fluid transfer between said sump system and said volume and for preventing solids from passing from said volume and into said sump system;
    an access pipe in fluid communication with said sump system; and
    means in fluid communication with said access pipe for introducing a treatment gas into said sump system for subsequent contact with said contaminated material.

2. An onsite treatment system as recited in claim 1 wherein said trench has a bottom surface and a sidewall, said bottom surface formed with a sloped portion and a sump reservoir with said sloped portion oriented to cause liquid to run along said sloped portion and into said sump reservoir.

3. An onsite treatment system as recited in claim 1 wherein said sump system comprises a sump reservoir, a layer of geotextile netting and at least one drain tube formed with a plurality of perforations to establish fluid transfer between said sump reservoir and the contaminated material.

4. An onsite treatment system as recited in claim 1 wherein said liner comprises a primary layer, a secondary layer and a layer of geotextile material.

5. An onsite treatment system as recited in claim 1 further comprising a leak detection system for determining whether fluids have leaked through said liner.

6. An onsite treatment system as recited in claim 5 wherein said liner comprises a primary layer, a secondary layer and a layer of geotextile material, and wherein said leak detection system comprises at least one slotted pipe disposed between said secondary layer and said layer of geotextile material and a means for collecting fluids in said slotted pipe.

7. An onsite treatment system as recited in claim 1 further comprising a cover for preventing the release of volatiles from the contaminated material.

8. An onsite treatment system as recited in claim 1 wherein said filtering means comprises a geotextile filter sheet.

9. An onsite treatment system as recited in claim 8 wherein said filtering means further comprises a layer of sand.

10. A system for onsite treatment of a contaminated material, said system comprising:
    a trench defining a holding volume for containing the contaminated material, said trench having a bottom surface and a sidewall, said bottom surface formed with a sloped portion and a sump reservoir with said sloped portion oriented to cause liquid to run along said sloped portion and into said sump reservoir;
    a liner positioned to cover said bottom surface and said sidewall to prevent fluids from leaking from said trench;
    a filtering means interposed between said trench bottom and said holding volume for allowing fluid transfer between said sump reservoir and said holding volume and for preventing solids from passing from said holding volume and into said sump reservoir;
    an access pipe in fluid communication with said sump reservoir;
    means for pumping a treatment fluid through said access pipe and into said sump for subsequent contact with said contaminated material; and
    means for pumping fluid through said access pipe from said sump to treat said contaminated material.

11. An onsite treatment system as recited in claim 10 wherein said system comprises a layer of geotextile netting and at least one drain tube formed with a plurality of perforations to establish fluid transfer between said sump reservoir and the contaminated material.

12. An onsite treatment system as recited in claim 10 wherein said liner comprises a primary layer, a secondary layer and a layer of geotextile material.

13. An onsite treatment system as recited in claim 10 further comprising a leak detection system for determining whether fluids have leaked through said liner.

* * * * *